United States Patent
Molin

[19]
[11] Patent Number: 6,111,944
[45] Date of Patent: Aug. 29, 2000

[54] METHOD FOR ROUTING INFORMATION IN OPERATIONS AND MAINTENANCE NETWORK OF TELEPHONE NETWORK

[75] Inventor: Sakari Molin, Järvenpää, Finland

[73] Assignee: Nokia Telecommunications Oy, Espoo, Finland

[21] Appl. No.: 08/824,733

[22] PCT Filed: Sep. 26, 1995

[86] PCT No.: PCT/FI95/00528

§ 371 Date: Mar. 26, 1997

§ 102(e) Date: Mar. 26, 1997

[87] PCT Pub. No.: WO96/10312

PCT Pub. Date: Apr. 4, 1996

[30] Foreign Application Priority Data

Sep. 27, 1994 [FI] Finland .................................. 944486

[51] Int. Cl.[7] .............................. H04M 7/00; H04M 3/22; H04M 3/00
[52] U.S. Cl. .............................. 379/219; 379/15; 379/269
[58] Field of Search .................................. 379/220, 207, 379/9, 15, 219, 269

[56] References Cited

U.S. PATENT DOCUMENTS

| 5,105,420 | 4/1992 | Ardon et al. . |
| 5,287,535 | 2/1994 | Sakagawa et al. . |
| 5,323,384 | 6/1994 | Norwood et al. . |
| 5,436,957 | 7/1995 | McConnel ............................ 379/88.23 |
| 5,583,920 | 12/1996 | Wheeler, Jr. .......................... 379/88.01 |
| 5,610,910 | 3/1997 | Focsaneanu et al. .................... 370/351 |
| 5,652,787 | 7/1997 | O'Kelley .................................. 379/112 |

FOREIGN PATENT DOCUMENTS

| 435 448 | 7/1991 | European Pat. Off. . |
| 613 313 | 8/1994 | European Pat. Off. . |

*Primary Examiner*—Harry S. Hong
*Attorney, Agent, or Firm*—Pillsbury Madison & Sutro, LLP

[57] ABSTRACT

The operation and maintenance network of a telephone network system comprises a plurality of operation and maintenance (OM) units for operation and maintenance of the telephone exchange connected thereto, and an operation and maintenance center (OMC). The center comprises a data communication unit (DCU) for receiving the information collected by the exchanges, and for routing it to the I/O device of the data management unit (DMU) corresponding to the logical device connection determined in a logical routing task. Upon adding new device units to the operation and maintenance center, the changes to the routing are made in a specific substitution table, and routing is performed by means of forced control to the I/O device indicated by the substitution table. If there is no change, the incoming information is routed to the physical I/O device corresponding to the logical device connection determined in the routing task.

4 Claims, 6 Drawing Sheets

METHOD FOR ROUTING INFORMATION IN OPERATIONS AND MAINTENANCE NETWORK OF TELEPHONE NETWORK

This application is the national phase of international application PCT/FI95/00528, filed Sep. 26, 1995 which designated the U.S.

BACKGROUND OF THE INVENTION

1. Field of the Invention

This invention relates to an operation and maintenance system of a telephone network, and routing of information in the system, in particular.

2. Description of Related Art

In a telephone network, the most important task of the maintenance service of an exchange is to make sure that the exchange will function in failure situations, i.e. to ensure the call switching capability when one unit of the exchange fails. In a failure situation, a faulty unit is disconnected and replaced with a stand-by unit. Maintenance service also includes reporting of charging information, as well as compiling reports on traffic control, alarm and monitoring. The maintenance programs are concentrated in the operation and maintenance unit (OMU) of an operation and maintenance center (OMC) connected to the exchange, in which OMU the necessary files are also located. Operation and maintenance (OM) of various exchanges is thus concentrated in the areal operation and maintenance center (OMC), the task of which is to collect in a centralized manner in the maintenance center of the telephone operator the above-mentioned charging information provided by the operation and maintenance (OM) of the telephone exchanges located within the area, as well as reports on traffic control, alarm, and monitoring. In extensive systems comprising a plurality of areal exchanges, and exchanges connected to them, the management of areal operation and maintenance centers (OMC), and concentrated collecting of their service information in a centralized manner may be subjected to an operation and maintenance center acting as the master controller.

The operation and maintenance centers thus form a so-called OM network (Operation and Maintenance Network), in which each OMC is a network element, which is specialized in collecting and storing the data produced by single exchanges of the system situated below it in the hierarchy. The OMC does not post-process this data, but post-processing is carried out elsewhere, such as in a Network Management Center. Data transmission between different network elements, i.e. OMC's may be implemented via a packet switched data network, which is represented in FIG. 1 by a schematically depicted X.25 network, or via time-slots reserved from semi-permanently connected PCM circuits, or via a network using the common channel signalling system #7 in accordance with the CCITT standard.

FIG. 1 shows an example of an OM-network. At the top of the hierarchy, there is a Network Management Center, NMC, and below it a Main Operation and Maintenance Center functioning as the main controller, and connected to areal Operation and Maintenance Centers OMC. To the last-mentioned, single exchanges and switching centers and exchanges are connected. The main operation and maintenance center is in charge of supervising the entire OM network. It is connected to the network management center NMC e.g. via an OSI interface (Open System Interface) in accordance with the standard.

As appears from FIG. 2, the functions of the operation and maintenance are distributed in an exchange to several microcomputer units, the software located in which is loaded under the control of an operation and maintenance unit OMU. The microcomputer units include identical data management units DMU, which are named according to the dedicated tasks, e.g. charging management unit, performance management unit, traffic monitoring unit, fault control management unit. In addition, they include data communication units DCU, via which analog and digital connections are transferred to the network and from the network. A data communication unit DCU comprises a so-called I/O manager, an interface to an internal message bus of the OMC, and multichannel signalling terminals, as well as serial communication terminals, via which the linkage to the network connecting the exchanges takes place. The microcomputer units comprise mass memories, which may be e.g. hard disks or floppy disks. Messages within the OMC between different units are transferred via a message bus MB. The message bus enables expanding the OMC to fulfil almost any requirements for data traffic and storage capacity, since the expansion may be implemented by adding microcomputer units to the bus according to the need.

When information is directed from one unit to another and from one exchange to another, in other words, when input and output are carried out, routing is performed. Thus, a so-called logical file forms an essential part of the I/O system. A logical file is a certain named gate that may be connected either to a certain number of I/O devices (FIG. 3a), or to other logical files that, in turn, may be connected to an I/O device (FIG. 3b). An alternative, more fitting expression for the term "logical file" would be "logical linkage", as it determines how the routing linkage is carried out. The figures represent a case in which the output data of a program, e.g. a fault control management program, providing the output is directed to an I/O device. The operator may modify the I/O connections of the system by changing the linkages of the logical files. In practice, the I/O devices are displays, terminals, printers, hard disks, disk drives, and magnetic tape units.

Reference is now made to FIGS. 4a and 4b. The program block connected to logical files is termed as an I/O manager. Upon providing an input or an output, i.e. an I/O function via a logical file, a unit, e.g. a fault control management unit, gives its manager a task related to a determined logical file. The I/O manager gives the task to the I/O manager of a second unit, provided that there is a logical file to logical device connection, or to the device driver if it is a question of a connection between a logical file and a device. The control of the I/O functions of the exchange is thus concentrated to the I/O manager of the maintenance and operation computer, which knows and maintains the linkages of the above-mentioned logical files. The I/O managers of different systems communicate with each other via an OM network. The operations may be described as follows: in FIG. 4a, in the section representing input, information is first directed from the I/O device of the operator to the logical file, and from there to an appropriate application program. In FIG. 4b, describing the output function, an application program block first directs the output to a predetermined logical file, and from there it is directed to an I/O device. The application program thus only recognizes the logical file to which it directs the output, or from which it reads the output, and only the I/O manager knows which one is the actual physical I/O device or which are the devices that correspond to the logical file.

When the number of computer-controlled telephone exchanges, and the services provided by them have increased, demands have arisen for flexible management of data transmission to a centralized operation and maintenance unit i.e an operation and maintenance center, OMC. When the number of exchanges subjected to an operation and maintenance center OMC, no matter whether it is an areal OMC or the master OMC, or the amount of information sent by the exchanges increases, a situation arises in which the capacity of data transmission of the OMC or the capacity of I/O devices is not sufficient.

The prior art knows two ways to solve the problem. Firstly, the capacity may be increased either by increasing the number of data communication units DCU of the OMC. Secondly, it is possible to increase the number of above-mentioned I/O devices, and distribute the load more evenly among them.

The prior art solutions, however, have a few drawbacks. Upon changing the installation of the operation and maintenance center OMC, it is a difficult operation to change the linkages of many of the I/O tasks of the numerous exchanges under the control of the OMC, so that they are correctly connected to different I/O devices of the OMC, the installation of which has been changed. For example, a typical case of expanding the OMC for distributing the calculation load is adding a specific charging storage unit including its hard disk. The charging reports arriving from the exchanges are thus directed to this charging storage unit. An increasing amount of reporting also requires that data communication units be added to the OMC, so that the increased need for data transfer of the operation and maintenance channels can be handled. These changes made in the operation and maintenance center OMC, in turn, result in that the data transfer control functions must be changed in all exchanges to the I/O devices of the OMC, so that they correspond to the new configuration.

SUMMARY OF THE INVENTION

This invention provides a method by means of which the above-mentioned additional measures are avoided, which are caused when the installation of the operation and maintenance center is changed. The method is characterized in that in the data communication unit DCU of the operation and maintenance center OMC, a substitution table is arranged in which each tabulated logical device connection on the input side is reflected as a logical device connection on the output side. A logical device connection defined in a received routing task is compared with logical device connections of the input side of the substitution table. When a logical device connection, the same as the one defined in the routing task, is found in the logical device connections on the input side of the substitution table, the incoming information is routed to a physical I/O device corresponding to the logical device connection of the output side. When it is detected that the same logical device connection as the one defined in the routing task is not to be found from the logical device connections of the input side of the substitution table, the incoming information is routed to a physical I/O device corresponding to the logical device connection determined in the routing task.

In accordance with the invention, all tasks incoming to the exchange are re-routed by means of forced control in one centralized unit. This unit is the I/O device manager of the data communication unit. The device manager finds out which is the target unit given in the task, and compares the logical file given in the task with the table of logical files, located in the memory of the manager. The memory is such that upon searching a certain logical file from it with a specific name, it results as a replacing logical file. If there is a logical file with the same name to be found in the memory, the logical file given in the task is substituted with said replacing file, as a result of which the routing directs the incoming data to a specific physical point determined by this replacing logical file. If there is no logical file with the same name to be found, no substitution is carried out, but the original logical file given in the task is used. Thus, the incoming data is directed to the physical point to which the transmitting exchange has intended them. Upon changing the installation of the OMC, such as adding new units, no changes thus need to be made in the exchanges, but all the changes are concentrated in the data communication unit DCU of the OMC.

BRIEF DESCRIPTION OF THE DRAWINGS

In the following, the invention will be described in closer detail by means of a preferred embodiment with reference to the accompanying drawings, in which.

DETAILED DESCRIPTION OF THE PREFERRED EMBODIMENT

Figure 5:
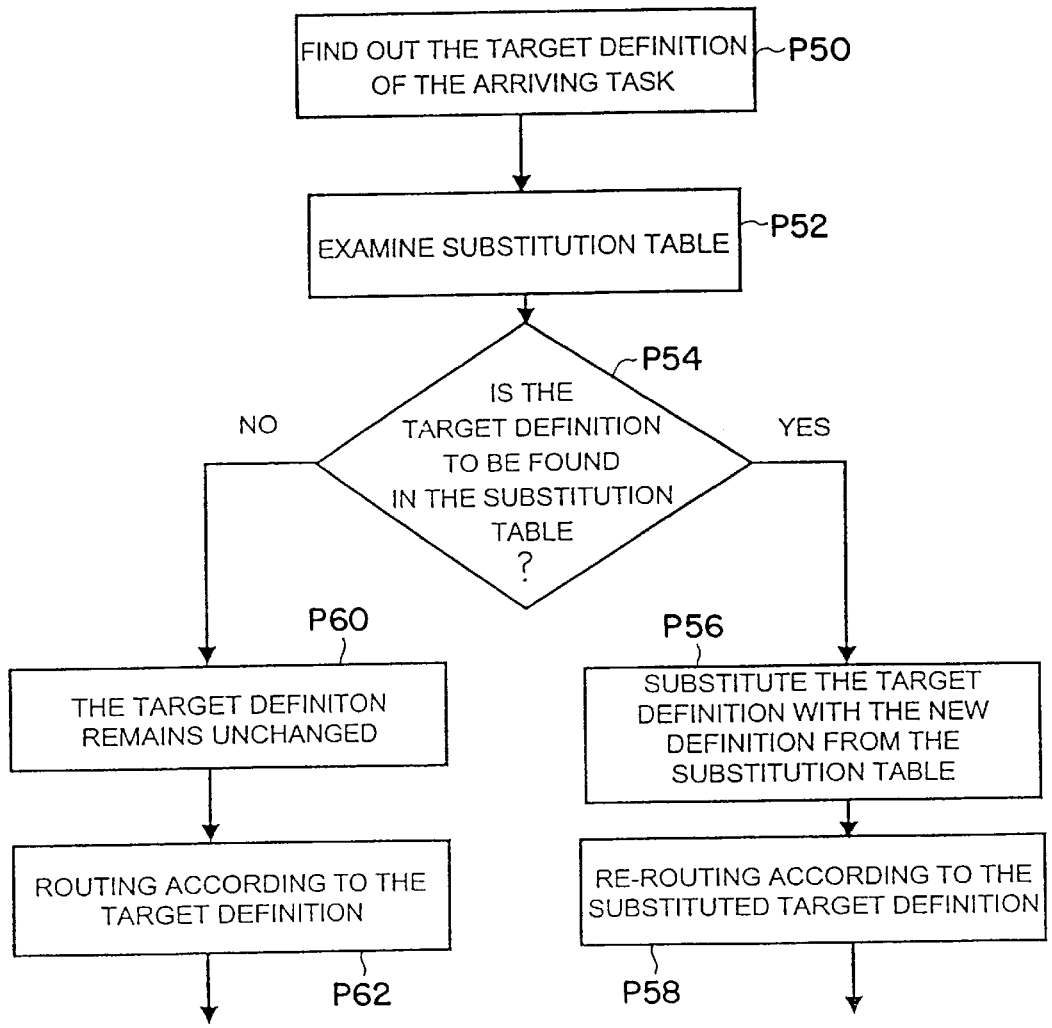
FIG. 5 shows a diagram illustrating the principle of the invention.

FIG. 5 is a diagram showing the basic principle of the method of the invention. The diagram shows the measures carried out in the data communication unit of the OMC. At P50, a task arrives at the unit from one exchange for routing the incoming data to the target. The target is given in the target definition. In the data communication unit, there is a substitution table from which all the changes and additions in the installation of the OMC appear. At P52, the table is read to determine which new target corresponds to an old target. At P54, the target definition of all incoming tasks is compared with the substitution table. Provided that the target definition of an incoming task can be found in the table, the table simultaneously gives a new target to which the incoming target definition is reflected. In that case, at P56 the target definition of the incoming task is replaced with a new target definition provided by the table, and at P58 routing takes place on the basis of the data provided by this new target definition. If there is no target definition for an incoming task in the table, at P60 it is known that replacement, i.e. re-routing is not carried out, at P62 and the original target definition of the incoming task is thus used as a target.

Figure 1:
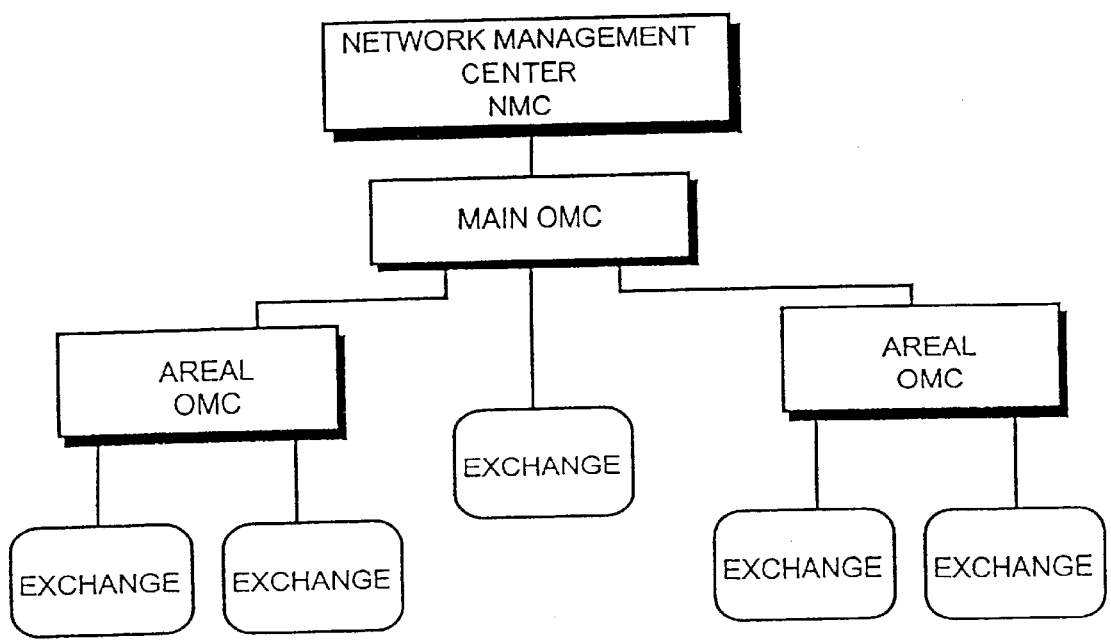
FIG. 1 shows an OM network.
Figure 2:
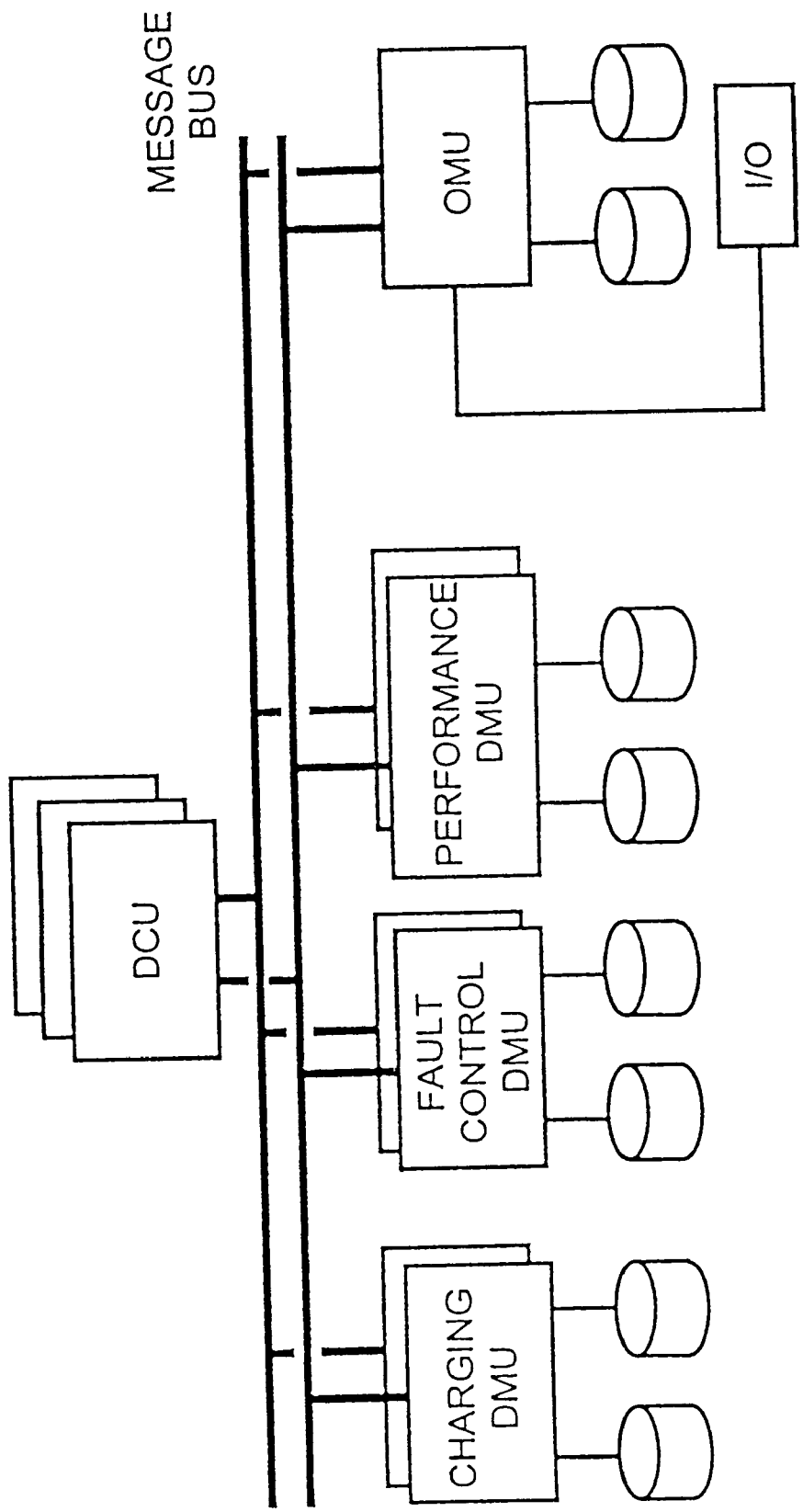
FIG. 2 shows an OMC structure.
Figure 3:
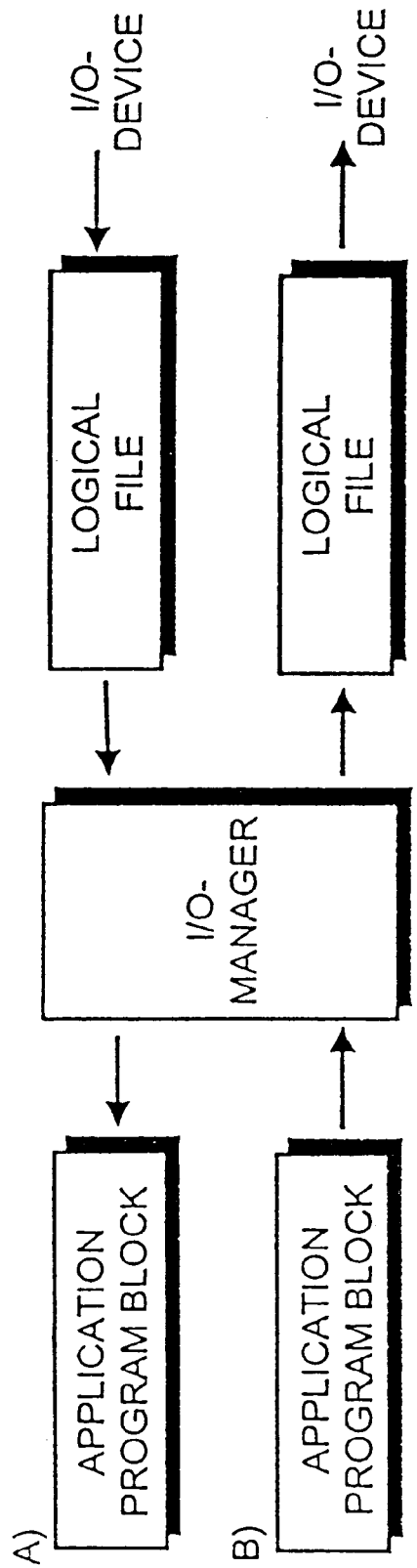
FIG. 3 illustrates linkages of logical files.
Figure 4A:
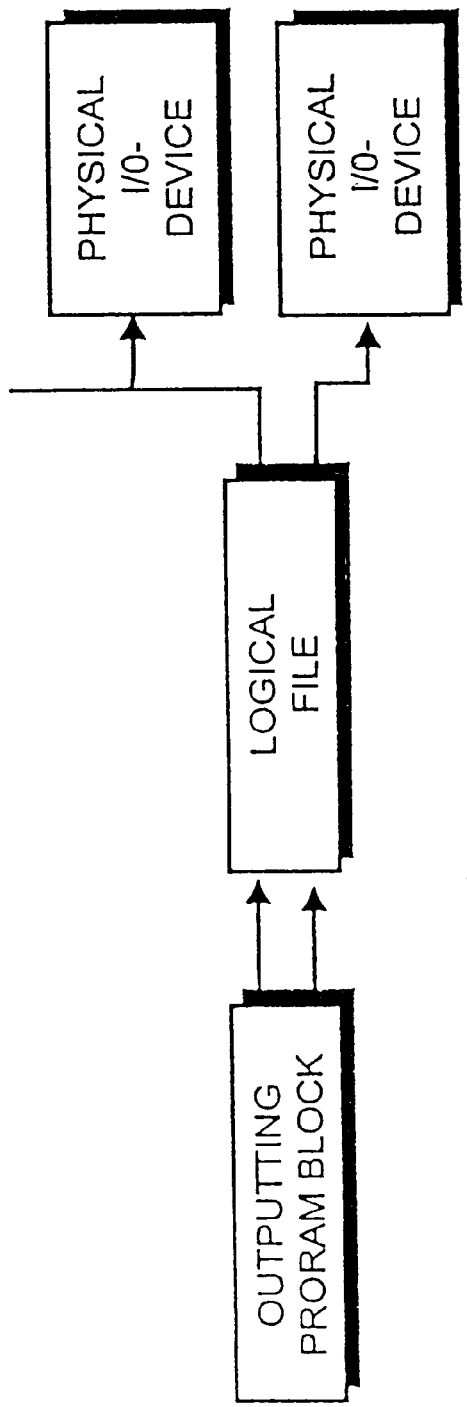
FIGS. 4a and 4b illustrate linkages of logical files.
Figure 4B:
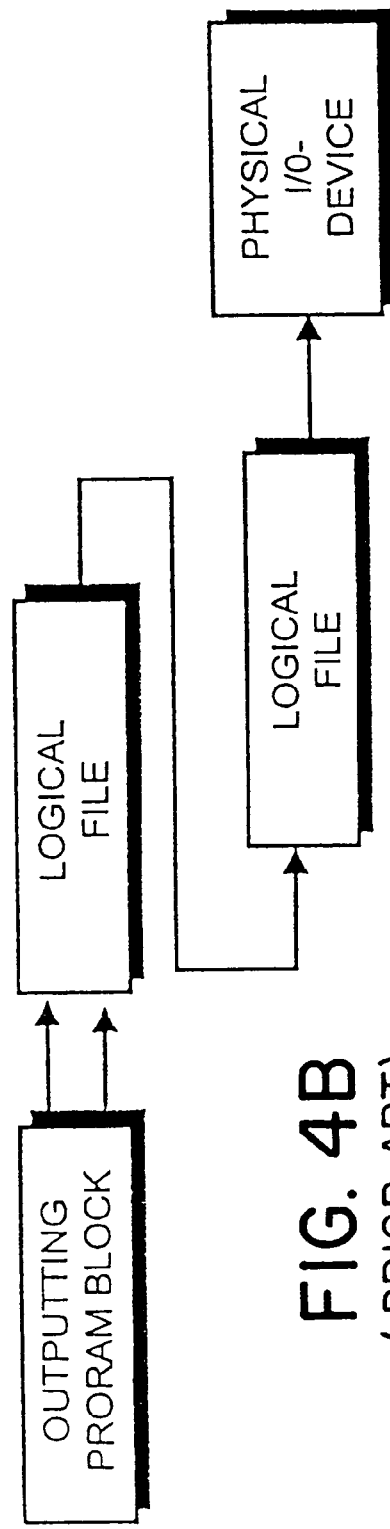
Figure 6:
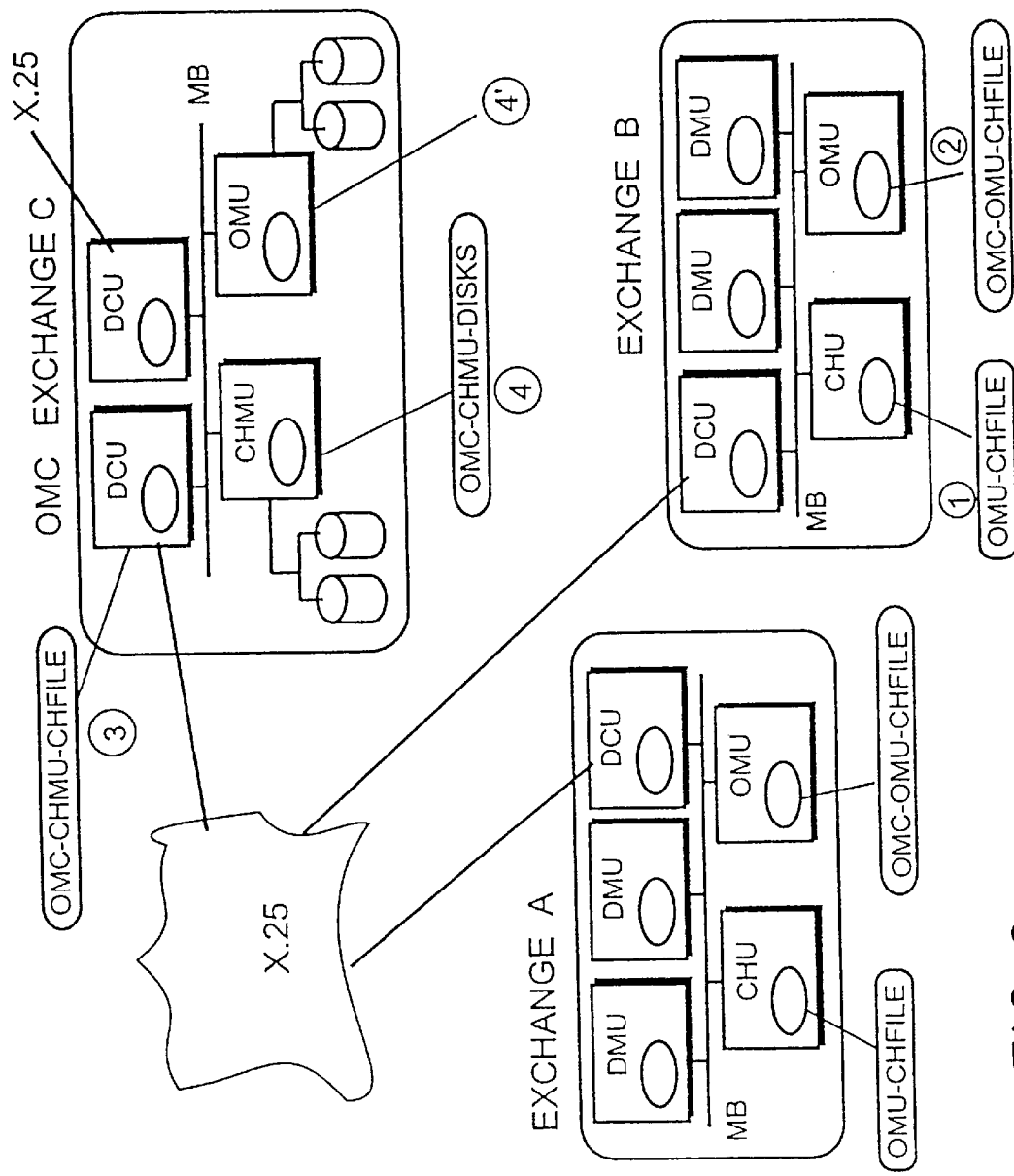
FIG. 6 shows an example of routing.

In the following, the invention is disclosed by way of an example in FIG. 6. FIG. 6 shows an operation and maintenance network formed by three exchanges, exchanges A, B, and C. Exchange C is e.g. an areal operation and maintenance center, which records data on charging, traffic, faults, etc. collected by exchanges A and B, sent via a packet switched X.25 network. As mentioned in the description of FIG. 2, the operation and maintenance blocks of exchanges A, B and C comprise an operation and maintenance unit OMU, and dedicated data management units DMU, from which a charging data management unit CHU has been distinguished by way of an example. All units have an individual I/O manager of their own, described in the unit by an ellipse drawn inside the block. Within the exchange, the units are connected to each other by a message bus MB, and data is going out from the exchange and coming into the exchange via a data communication unit DCU.

Let us study the events, when exchange B sends charging data of the charging data management unit CHU to operation and maintenance center C, and an appropriate routing must be performed. Let us assume that previously, charging data has been directed to another hard disk of the operation and maintenance unit OMU of exchange C. Later, a charging management unit CHMU has been added to the OMC exchange C, to which CHMU the charging data is directed instead of the operation and maintenance unit OMU by using the method of the invention, although exchange B still thinks that the actual recording point is the hard disk of the OMU of exchange C. The events are illustrated with ringed numbers. The I/O manager of the management unit CHU directs (event 1) a task to a logical file OMU-CHFILE, which refers to the operation and maintenance unit OMU of the same exchange. Its I/O manager, in turn, provides (event 2) as the target of the task a logical file OMC-OMU-CHFILE, indicating that the target is the logical file CHFILE of the operation and maintenance unit OMU of exchange C acting as the OMC exchange. The DCU of exchange B collects a task from a bus MB, and sends it via a packet switched network to operation and maintenance center C, in which it is received by the data communication unit DCU of the OMC (event 3).

Prior to expanding operation and maintenance center C, the I/O device manager has directed the task to the OMU, the device manager of which has finally directed the charging data to a physical device. This is described by event 4.

In accordance with the invention, an arrangement has now been carried out in the data communication unit DCU, which arrangement directs all the I/O tasks incoming to the OMC exchange to the substitution table located at the I/O manager of this unit, by means of which table the routing is forced to another location instead of the target unit determined in the incoming task. Thus, the incoming task OMC-OMU-CHFILE of this example is not directed to the operation and maintenance unit OMU, but to the charging data management unit CHMU. In the memory of the device manager, there are tables that show which logical device is reflected to which actual physical device. In accordance with the invention, it is examined, whether a logical file with a corresponding name is to be found in a specific substitution table. If such a file is found, a logical file corresponding to it is obtained from the table. In the example used the substitution table provides the information that the logical connection OMC-OMU-CHFILE is replaced with a logical connection OMC-CHMU-CHFILE. The target unit OMU is thus replaced with a target unit CHMU, which is a new added charging information storage unit. Thus, the logical file directs the task to the I/O manager of the CHMU (event 4), which manager directs the charging information to a physical I/O device, i.e. to the hard disk of the charging management data unit CHMU.

If the logical file determined in an incoming task is not found in the substitution table, it is known that the logical file has not been replaced with any other one, in which case the original target of the task, determined in exchange B will be used. In this example, the logical file OMC-OMU-CHFILE would not be replaced with a new one, but the information would be directed to the target determined in exchange B, i.e. to the hard disk of the operation and maintenance unit OMU.

By using the substitution table in accordance with the invention, routing of the tasks may be re-configurated in the data communication unit DCU of the operation and management center OMC, whereby upon changing the installation of the OMC, such as upon adding units in accordance with the task, the changes need to be made in this operation and management center only. No changes need to be made in exchanges located below the OMC in the hierarchy. Since in accordance with the invention, the control of data communication is concentrated in the routing computers of the operation and maintenance center OMC, managing the data transfer in an OM network is remarkably facilitated. This is a remarkable advantage compared with the prior art.

It is to be understood that the above description and the figures associated therewith are only intended to illustrate the present invention. Different variations and modifications of the invention will be obvious to persons skilled in the art, without deviating from the scope and the spirit of the invention set forth in the attached claims.

I claim:

1. A method for routing information to an I/O device of an operation and maintenance center in an operation and maintenance network of a telephone network system, the operation and maintenance network of the telephone network system comprising:

at least one operation and maintenance element, for operation and maintenance of a telephone exchange connected thereto, the operation and maintenance center communicating with the at least one operation and maintenance element of the operation and maintenance network, the operation and maintenance center comprising operational units each having an I/O device and a data communication unit for receiving routing tasks containing information collected by the at least one operation and maintenance element, and for routing the information to an I/O device of an appropriate one of the operational units based on a logical device connection definition in a respective one of the received logical routing tasks, the method comprising:

providing a substitution table in the data communication unit of the operation and maintenance center, in the substitution table each tabulated logical device connection at an input side points to a new logical device connection at an output side, so that when a configuration of the operation and maintenance center has changed and the logical device connection is no longer valid, a routing can be made to the new logical device connection within the operation and maintenance center;

comparing a logical device connection definition in the received routing task with the logical device connections at the input side of the substitution table;

in response to a comparison result that one of the logical device connections at the input side of the substitution table matches to the logical device connection definition in the routing task, retrieving from the substitution table the new logical device connection pointed by the matching logical device connection at the input side of the substitution table, and routing the incoming information to the I/O device which corresponds to the new logical device connection; and in response to a comparison result that none of the logical device connections of the input side of the substitution table matches to the logical device connection definition in the routing task, routing the incoming information to the I/O device which corresponds to the logical device connection definition in the routing task.

2. A method as claimed in claim 1, further comprising:

making necessary changes to the logical connections in the substitution table upon adding new operational units to the operation and maintenance center.

3. A method as claimed in claim 1, wherein the substitution table is recorded in a memory, and an operator makes the changes in the substitution table by using software.

4. A method as claimed in claim 2, wherein the substitution table is recorded in a memory, and an operator makes the changes in the substitution table by using software.

* * * * *